United States Patent Office 2,781,599
Patented Feb. 19, 1957

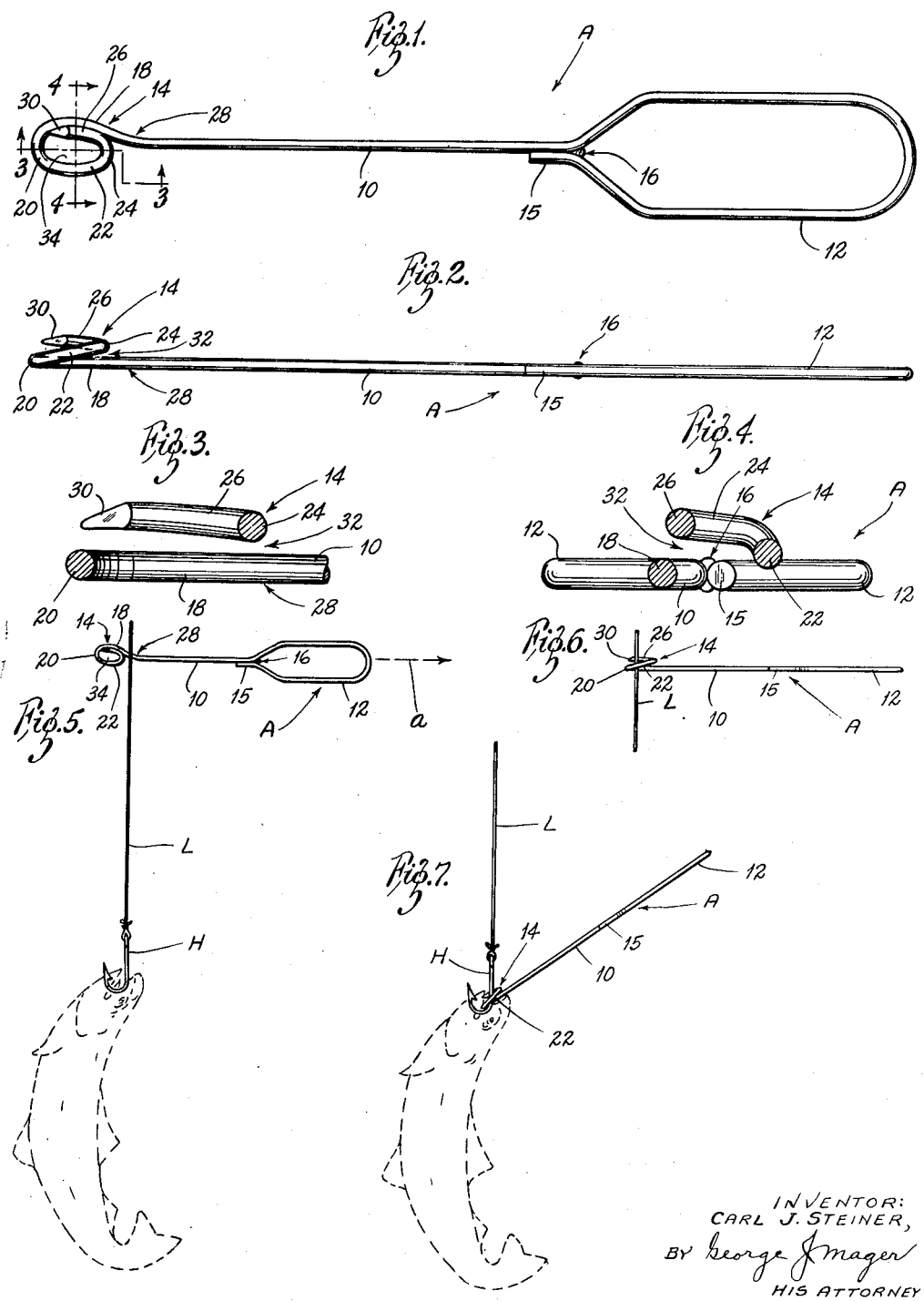

2,781,599

FISHHOOK RELEASE IMPLEMENT

Carl J. Steiner, Alton, Ill.

Application March 15, 1955, Serial No. 494,367

1 Claim. (Cl. 43—53.5)

The present invention relates generally to a novel and improved device for use by fishermen, particularly fishermen who employ the hook and line method in pursuing the sport.

More specifically, the invention relates to a novel implement adapted to facilitate the separation of a fish that has been caught, from the hook wherewith the fish has been captured and landed, as is understood.

As is well known, the release or removal of a barbed fishhook from the body of a fish caught thereon frequently presents a tedious and sometimes distasteful chore, particularly to those who are averse to manual subjugation of the fish.

The primary object of my invention therefore, is to provide a simple and inexpensive implement wherewith the separation of fish and hook may be accomplished without the necessity of manually contacting the fish.

It is another object of my invention to provide a device that requires little skill in the performance of a fishhook release operation.

It is a further object to provide a device that may be carried in the pocket or hung onto the belt of a fisherman when not in use.

It is common knowledge that the manual release of a fishhook sometimes results in personal injury, and it is another object of the present invention to provide an implement designed not only to facilitate the separation of a hook from the fish thereon, but also designed to obviate the danger of personal injury that could result in consequence of such an undertaking.

Preferably, but not necessarily, the device of the invention comprises a single length of comparatively heavy wire that is fashioned into a handle portion at one end, and into a novel helical subsantially oval loop at the opposite end thereof, the intermediate portion of the wire being straight, as will appear.

The invention is comprehensively illustrated on a sheet of drawings that accompanies this specification.

In said drawings:

Figure 1 is a top plan view of a fishhook release implement constructed in accordance with the principles of the present invention;

Figure 2 is an edge view thereof;

Figure 3 is a longitudinal sectional view on an enlarged scale, taken along the line 3—3 of Figure 1;

Figure 4 is a transverse sectional view on an enlarged scale, taken along the line 4—4 of Figure 1;

Figure 5 is a generally diagrammatical view demonstrating the initial step taken in the use of the invention;

Figure 6 is a similar view demonstrating the intermediate step taken in the use of the invention; and Figure 7 is a generally diagrammatical view demonstrating an exemplary disposition of the invention during the final step taken.

As hereinbefore noted, the device A comprising the present invention is preferably formed from a single piece of comparatively heavy wire. It includes an elongated shank portion 10 that terminates at one end in a suitably fashioned handle portion designated 12, and at the other end in an oval loop formation generally designated 14.

The handle 12 is preferably fashioned into a loop substantially as shown, whereby to provide for easy manipulation of the device. The terminal end 15 of the wire forming said handle portion is welded or soldered to the shank 10 as indicated at 16.

Viewed in plan, as in Figure 1, the loop formation 14 is of substantially oval configuration. However, as seen in Figure 2, it also has a helical contour. In the interest of descriptive simplicity, the loop formation will be divided into five sections or segments designated 18, 20, 22, 24 and 26.

The segment 18 is of arcuate contour and coplanar with the shank 10, merging into said shank as indicated at 28. The segment 20 is of semicircular contour and is coplanar with the segment 18 from the point of mergence thereinto, to the point of mergence into the segment 22. The last named segment is of arcuate contour and slopes spirally upwardly as shown, in consequence whereof the thereinto merging portion of the segment 20 also slopes correspondingly, as should be evident. The segment 24 is of semicircular contour, but formed on a radius slightly smaller than that whereon the segment 20 is formed. One end of the segment 24 merges into the segment 22 aforesaid, and the other end thereof merges into the terminal segment 26 of said loop formation. The segment 26 is of arcuate contour, and slopes spirally upwardly in a direction opposite that of the segment 22, as shown. The segment 26 terminates in a pointed or tapered tip portion 30, it being noted that the apex of said tip portion overlies the segment 20.

From the foregoing description and an inspection particularly of Figures 3 and 4, it should be manifest that the loop formation 14 is so formed as to provide a space or opening designated 32 that lies between, or is so to speak defined by the arcuate segments 18 and 26.

*Use*

The manner of employing the invention is demonstrated in Figures 5 through 7. In these views, a fishing line designated L is shown in well known association with an ordinary barbed hook designated H.

Assuming first, that as demonstrated in Figure 5, a fish after having been caught and raised clear of the water is struggling to free itself from the hook H, the fisherman positions the implement A to one side of the line L, and by meens of the handle 12, moves the implement in his direction as suggested by the dotted line arrow *a* until the line, passing through the opening 32, enters the substantially oval space 34 enclosed by the loop formation 14.

As the line L contacts the segment 20, the fisherman by means of the handle 12 would swing the implement A through an arc of approximately 90°, that is to say, until the segment 26 is uppermost. In consequence of this procedure, the line L would be confined within the space 34, as demonstrated in Figure 6.

In this connection, it is noted that the tapered extremity 30 of the segment 26, together with the disposition thereof relatively to the segments 18 and 20, serves to prevent entry into and subsequent escape of the line from the opening 32 in consequence of the strugglings of the suspended fish.

Therefore, assuming now that the fisherman, who may be standing on shore or in a boat, is holding the line L in his left hand and the implement A in his right hand, he may propel said implement angularly downwardly until the loop 14 engages the hook H, whereby to produce what may be considered a rigid substantially V-shaped stabilizing means applied to said hook. As a result, the fish may now release itself from the hook in consequence of its violent efforts to attain freedom, or the fish may be released in consequence of shaking the implement by the fisherman. In either event, the fish would be separated from the hook without being touched by the fisherman.

It is to be understood that the Figure 7 demonstration of the final step is of course exemplary only. That is to say, this showing is predicated on the premise that the hook H is so to speak embedded in the head of the fish. In the event the fish had swallowed the hook, the implement A would be disposed more nearly parallel to the line L in the final operation.

Attention is directed to the importance of the tapered extremity 30 of the segment 26. Obviously, in the course of the downward movement of the loop 14 from the Figure 6 disposition thereof to that portrayed in Figure 7, the line L though taut, will fluctuate within the space 34 as a result of the continuing efforts of the fish to free itself. If, and whenever in the course of such fluctuations, the line L tends to enter the opening 32, it is immediately deflected inwardly as it contacts said extremity. In other words, the tapered extremity 30 serves as a guard to prevent escape of the line from the loop formation 14, when the implement is disposed in operative status, as should be apparent.

The foregoing description augmented by an inspection of the drawings is believed adequate for a complete understanding of the invention. Also, it is to be understood that the invention contemplates any modifications that may fall within the scope of the claim hereunto appended.

What I claim is:

An implement wherewith the separation of a fish from the hook whereon said fish has been caught may be accomplished without manually contacting the fish, said implement being formed from a length of relatively heavy wire material to comprise an elongated shank portion terminating at one end in a handle portion, and at the opposite end in an oval helically generated loop portion, the loop portion being adapted by means of said handle portion to be first manipulated into a position wherein a fishing line suspended from above will be confined therein, and thereupon to be propelled angularly downwardly until said loop portion engages a fishhook secured on the lower end of said line, said loop portion including: a first segment of arcuate contour that is coplanar with and merges into the shank portion aforesaid; a second segment of semicircular contour; a third segment of arcuate contour that slopes upwardly in a direction toward the handle portion, said second segment being coplanar with the first segment from the point of mergence thereinto to the point of mergence into said third segment; a fourth segment of semicircular contour formed on a radius slightly smaller than the radius whereon the aforesaid second segment is formed; a fifth segment of arcuate contour that slopes upwardly in a direction away from the handle portion, said fourth segment merging into the third segment and in a higher plane into said fifth segment in helical fashion; said first and fifth segments defining an opening therebetween for entrance of the line into said loop portion; and a tapered tip constituting the terminal end of the fifth segment aforesaid, the apex of said tip portion overlying the second segment aforesaid whereby to obviate escape of the line from the loop via said opening when the implement is in operational status.

References Cited in the file of this patent

UNITED STATES PATENTS

| | | |
|---|---|---|
| 2,397,916 | Bray | Apr. 9, 1946 |
| 2,441,458 | Underwood | May 11, 1948 |